United States Patent
Kuwahara

(10) Patent No.: US 9,876,391 B2
(45) Date of Patent: Jan. 23, 2018

(54) POWER CONVERSION APPARATUS, CONTROL SYSTEM, AND CONTROL METHOD

(71) Applicant: KYOCERA Corporation, Kyoto-shi, Kyoto (JP)

(72) Inventor: Hitoshi Kuwahara, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 188 days.

(21) Appl. No.: 14/781,892

(22) PCT Filed: Apr. 1, 2014

(86) PCT No.: PCT/JP2014/059628
§ 371 (c)(1),
(2) Date: Oct. 1, 2015

(87) PCT Pub. No.: WO2014/163074
PCT Pub. Date: Oct. 9, 2014

(65) Prior Publication Data
US 2016/0043597 A1 Feb. 11, 2016

(30) Foreign Application Priority Data
Apr. 1, 2013 (JP) .................................. 2013-076261

(51) Int. Cl.
*H02J 3/38* (2006.01)
*H02J 9/00* (2006.01)
(Continued)

(52) U.S. Cl.
CPC .............. *H02J 9/062* (2013.01); *H02J 3/383* (2013.01); *H02J 3/387* (2013.01); *H02J 7/0068* (2013.01);
(Continued)

(58) Field of Classification Search
CPC .......... H02J 9/062; H02J 3/387; H02J 7/0068; H02J 3/383; H02J 7/35; H02M 3/04; H02M 7/44; Y02E 10/566; Y02E 10/563
See application file for complete search history.

(56) References Cited

U.S. PATENT DOCUMENTS

| 4,401,935 A | 8/1983 | Yerkes |
| 7,880,334 B2 * | 2/2011 | Evans .................. H02J 3/387 307/66 |

(Continued)

FOREIGN PATENT DOCUMENTS

| JP | 2006-280177 A | 10/2006 |
| JP | 2010-252596 A | 11/2010 |

(Continued)

OTHER PUBLICATIONS

Supplementary European Search Report dated Dec. 20, 2016 issued by the European Patent Office in counterpart European Application No. 14 77 9847. (8 pages).

(Continued)

*Primary Examiner* — Kenneth B Wells
(74) *Attorney, Agent, or Firm* — Procopio Cory Hargreaves and Savitch LLP

(57) ABSTRACT

PCS 400 operates in any one of a standard mode and a charging mode within a plurality of operation modes at a time when PV 100 operates. The plurality of operation modes include the standard mode in which an output of the PV 100 is converted into AC power and the AC power is supplied to grid 1 and/or load 300 and the charging mode in which the output of the PV 100 is supplied to storage battery 200. An output voltage of the DC/DC converter 410 is different in the standard mode and in the charging mode.

12 Claims, 7 Drawing Sheets

(51) Int. Cl.
*H02J 9/06* (2006.01)
*H02J 7/35* (2006.01)
*H02J 7/00* (2006.01)
*H02M 3/04* (2006.01)
*H02M 7/44* (2006.01)

(52) U.S. Cl.
CPC .............. *H02J 7/35* (2013.01); *H02M 3/04* (2013.01); *H02M 7/44* (2013.01); *Y02E 10/563* (2013.01); *Y02E 10/566* (2013.01); *Y02P 90/50* (2015.11)

(56) References Cited

U.S. PATENT DOCUMENTS

| | | | | |
|---|---|---|---|---|
| 8,106,535 | B2* | 1/2012 | Nishimura | H02J 7/35 307/44 |
| 8,482,155 | B2* | 7/2013 | Choi | H02J 3/32 307/71 |
| 9,030,168 | B2* | 5/2015 | Iwai | H01M 10/465 320/107 |
| 2002/0047309 | A1* | 4/2002 | Droppo | H02J 7/34 307/43 |
| 2008/0272653 | A1* | 11/2008 | Inoue | H02J 7/35 307/47 |
| 2009/0086520 | A1* | 4/2009 | Nishimura | H02M 3/33576 363/133 |
| 2011/0291479 | A1 | 12/2011 | Lee | |
| 2014/0042811 | A1 | 2/2014 | Myamoto et al. | |
| 2014/0183945 | A1 | 7/2014 | Kusunose | |

FOREIGN PATENT DOCUMENTS

| | | |
|---|---|---|
| JP | 2012-228043 A | 11/2012 |
| JP | 2012-244882 A | 12/2012 |
| JP | 2013-031266 A | 2/2013 |

OTHER PUBLICATIONS

International Search Report dated May 13, 2014 issued for International Application No. PCT/JP2014/059628.
Supplementary European Search Report dated Dec. 20, 2016 issued by the European Patent Office in counterpart European Application No. 14779874.4. (8 pages).

* cited by examiner

POWER CONVERSION APPARATUS, CONTROL SYSTEM, AND CONTROL METHOD

TECHNICAL FIELD

The present invention relates to a power conversion apparatus, a control system, and a control method, which convert an output of a distributed power source.

BACKGROUND ART

In recent years, introduction of a distributed power source is ongoing in a consumer's facility which uses grid power. The distributed power source includes, for example, a power generation apparatus such as a photovoltaic cell and a fuel cell, and a storage battery.

While the output of the distributed power source (the photovoltaic cell, the fuel cell, and the storage battery) is DC power, the grid power is AC power. For this reason, a load supplied with the power from the grid is also configured to correspond to the specification of the AC power. Therefore, there is known a power conversion apparatus which converts the output of the distributed power source into the AC power and supplies the AC power to the grid and/or the load. The power conversion apparatus includes a DC/AC converter which converts the DC power into the AC power.

In a case where the power conversion apparatus is in a connected state with the grid, the power conversion apparatus converts the output of the distributed power source into the AC power, and outputs the AC power to a distribution board, so as to supply the power to the grid and/or the load. Such an operation of the power conversion apparatus is called a connected operation.

Alternatively, in a case where the power conversion apparatus is in a disconnected state with the grid due to blackout or the like of the grid, the power conversion apparatus converts the output of the distributed power source into the AC power, and outputs the AC power to a self-sustained operation outlet or the like, so as to supply the power to the load. Such an operation of the power conversion apparatus is called a self-sustained operation.

In addition, there is known a hybrid power conversion apparatus which can be used for both of the power generation apparatus (for example, the photovoltaic cell) and the storage battery. The hybrid power conversion apparatus supplies the outputs of the power generation apparatus and the storage battery to the grid and/or the load, so as to perform the connected operation or the self-sustained operation. In addition, the hybrid power conversion apparatus supplies the output of the power generation apparatus as the DC power to the storage battery, so as to charge the storage battery (for example, Patent Literature 1).

PRIOR ART DOCUMENT

Patent Document

Patent Document 1: Japanese application publication No. 2012-228043

SUMMARY OF THE INVENTION

A power conversion apparatus needs to convert output of a distributed power source into AC power having a voltage suitable to be supplied to a grid and a load in order to perform a connected operation or a self-sustained operation. The power conversion apparatus further includes a DC/DC converter which is connected to a power source line of the distributed power source. The DC/DC converter converts (boosts) the output of the distributed power source into DC power having a voltage (hereinafter, referred to as an intermediate voltage) determined according to a setting voltage of the grid, and outputs the voltage to the DC/AC converter. The DC power having the intermediate voltage is converted into the AC power having a voltage suitable to be supplied to the grid and the load by the DC/AC converter. Therefore, the output of the distributed power source can be supplied to the grid and/or the load, and the power conversion apparatus performs the connected operation or the self-sustained operation.

In a case where the storage battery is charged by the output of the power generation apparatus, the hybrid power conversion apparatus boosts the output of the power generation apparatus by the DC/DC converter and then supplies the boosted output to the storage battery. However, a charging voltage of the storage battery is generally lower than the intermediate voltage. Therefore, in a case where the storage battery is charged by the output of the power generation apparatus, it is necessary that the hybrid power conversion apparatus boosts the output of the power generation apparatus up to the intermediate voltage by the DC/DC converter, and then decreases the boosted output down to the charging voltage of the storage battery. For this reason, in addition to a conversion loss caused at the time of the boosting, a conversion loss caused at the time of the decreasing also occurs in the output of the power generation apparatus.

Therefore, it is desirable to provide a power conversion apparatus, a control system, and a control method which suppress the conversion loss of the output of the power generation apparatus.

A power conversion apparatus according to first aspect operates while switching a plurality of operation modes. The plurality of operation modes includes a first mode in which an output of the power generation apparatus is converted into AC power and the AC power is supplied to at least one of a grid and a load and a second mode in which the output of the power generation apparatus is supplied to a storage battery. The power conversion apparatus comprises a DC/DC converter that is connected to a power source line of the power generation apparatus; and a DC/AC converter that is connected to the DC/DC converter through a first power line. The DC/DC converter is connected to the storage battery through a second power line which branches from the first power line, and an output voltage of the DC/DC converter is different in the first mode and in the second mode.

In the first aspect, the DC/DC converter is configured to in the first mode, output DC power having a first voltage determined according to a setting voltage of the grid, and in the second mode, output DC power having a second voltage determined according to a charging voltage of the storage battery.

In the first aspect, the power conversion apparatus further comprises a control unit that selects any one of the first mode and the second mode among the plurality of operation modes in a time-division manner.

In the first aspect, the load is a load that performs an intermittent operation, and at the time when the power generation apparatus operates, the control unit selects any one of the first mode and the second mode according to an operation state of the load in a case where the power conversion apparatus is in a disconnected state with the grid.

In the first aspect, at the time when the power generation apparatus operates, the control unit selects the second mode in a case where the power conversion apparatus is in the disconnected state with the grid and the power consumption of the load is smaller than a first threshold.

In the first aspect, at the time when the power generation apparatus operates, the control unit selects the first mode in a case where the power conversion apparatus is in the disconnected state with the grid and the power consumption of the load is larger than the first threshold.

In the first aspect, the control unit selects the second mode in a case where the power consumption of the load exceeds the first threshold and then a predetermined time elapses.

In the first aspect, at the time when the power generation apparatus operates, the control unit selects the second mode in a case where the power conversion apparatus is in the disconnected state with the grid, and the power consumption of the load is smaller than the first threshold and the output of the power generation apparatus is lower than a second threshold.

In the first aspect, at the time when the power generation apparatus operates, the control unit selects the second mode in a case where the power conversion apparatus is in the disconnected state with the grid, and the power consumption of the load is smaller than the first threshold and the output of the power generation apparatus is larger than a second threshold.

In the first aspect, at the time when the power generation apparatus operates, the control unit selects the first mode in a case where electric energy accumulated in the storage battery is larger than a predetermined value.

In the first aspect, at the time when the power generation apparatus operates, the control unit selects any one of the first mode and the second mode according to a voltage of the grid in a case where the power conversion apparatus is in a connected state with the grid.

A control system according to second feature comprises a power conversion apparatus that operates while switching a plurality of operation modes and a control apparatus that controls the power conversion apparatus. The plurality of operation modes includes a first mode in which an output of the power generation apparatus is converted into AC power and the AC power is supplied to at least one of a grid and a load and a second mode in which the output of the power generation apparatus is supplied to a storage battery. The power conversion apparatus includes a DC/DC converter that is connected to a power source line of the power generation apparatus and a DC/AC converter that is connected to the DC/DC converter through a first power line. The DC/DC converter is connected to the storage battery through a second power line which branches from the first power line. An output voltage of the DC/DC converter is different in the first mode and in the second mode. The control apparatus selects any one of the first mode and the second mode in a time-division manner.

A control method according to third feature is applied to a power conversion apparatus. The power conversion apparatus including a DC/DC converter connected to a power source line of a power generation apparatus and a DC/AC converter connected to the DC/DC converter through a first power line. The DC/DC converter being connected to a storage battery through a second power line which branches from the first power line. The control method comprises the steps of: switching, in a time-division manner, a first mode in which the power conversion apparatus converts an output of the power generation apparatus into AC power and supplies the AC power to at least one of a grid and a load, and a second mode in which the output of the power generation apparatus is supplied to the storage battery; and outputting, by the DC/DC converter, a voltage which is different in the first mode and in the second mode.

DESCRIPTION OF EMBODIMENTS

Figure 1:
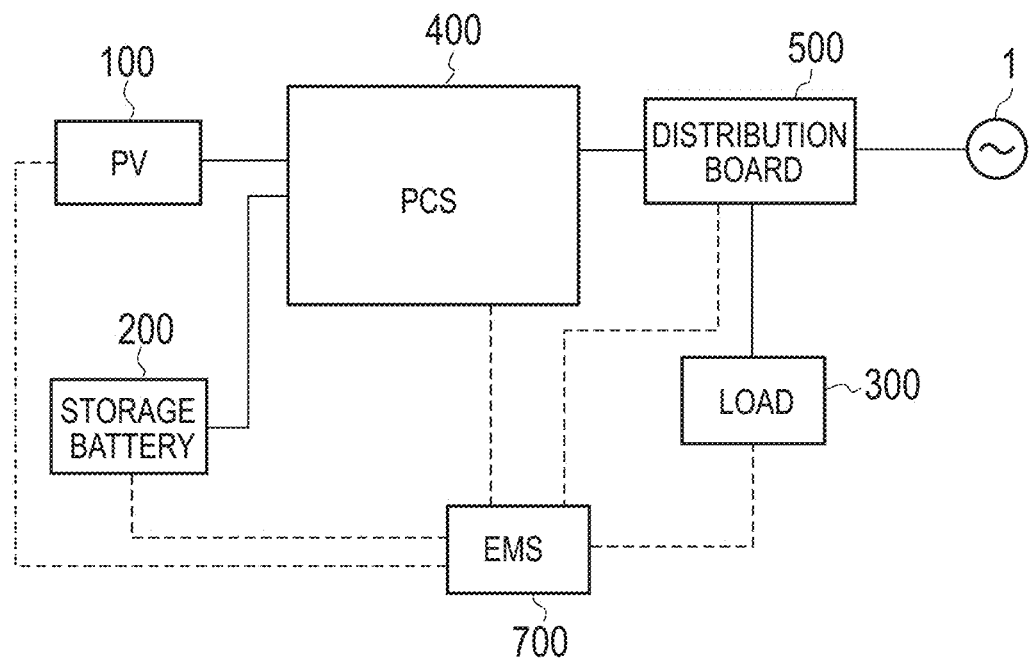
FIG. 1 is a diagram illustrating the entire configuration of a control system according to an embodiment of the present invention.

In the following, a power conversion apparatus, a control system, and a control method according to an embodiment of the present invention will be described with reference to the drawings. In the following description with respect to the drawings, the same or similar components will be denoted with the same or similar symbols.

However, it should be noted that the drawing is schematically illustrated, so that respective dimensions and scales thereof are different from actual ones. Therefore, specific dimensions should be determined with reference to the explanation below. In addition, it is a matter of course that some components may be illustrated in different dimensions or scales from each other even between the drawings.

Overview of Embodiment

A power conversion apparatus according to embodiment operates in at least one of a first mode and a second mode of a plurality of operation modes at a time when the power generation apparatus operates. The plurality of operation modes include the first mode in which an output of the power generation apparatus is converted into AC power and the AC power is supplied to at least one of a grid and a load and the second mode in which the output of the power generation apparatus is supplied to a storage battery. The power conversion apparatus comprises a DC/DC converter that is connected to a power source line of the power generation apparatus and a DC/AC converter that is connected to the DC/DC converter through a first power line. The DC/DC converter is connected to the storage battery through a second power line which branches from the first power line. An output voltage of the DC/DC converter is different in the first mode and in the second mode.

This makes it possible to suppress the conversion loss of the output of the power generation apparatus.

Present Embodiment

Hereinafter, the control system according to the present embodiment will be described in an order of (1) Entire configuration of the control system, (2) Detailed configuration of a PCS, (3) Operation mode of the PCS, and (4) Control method.

(1) Entire Configuration of Control System

FIG. 1 is a diagram illustrating the entire configuration of the control system according to the present embodiment. In the following drawing, a power line is depicted with the solid line, and a signal line is depicted with the broken line. The signal line is not limited to a wired line, but may be a wireless line.

As illustrated in FIG. 1, in the control system according to the present embodiment, a consumer's facility supplied with AC power from a grid 1 is provided with a photovoltaic cell (PV) 100, a storage battery 200, a load 300, a power conditioning subsystem (PCS) 400, a distribution board 500, and an EMS 700.

The PV 100 is an example of the distributed power source, and serves as a power generation apparatus which receives sunlight and generates power. The PV 100 outputs the generated DC power to the PCS 400. The PV 100 is configured of one or a plurality of panels. In addition, the PV 100 may be configured using a plurality of strings which is made of a plurality of panels.

The storage battery 200 is an example of the distributed power source, and serves as an apparatus for storing the DC power. The storage battery 200 discharges the stored DC power, and outputs the DC power to the PCS 400. In addition, the storage battery 200 is charged with the DC power supplied from the PCS 400.

The load 300 is an apparatus consuming the AC power supplied through the power line. Examples of the load 300 include an illuminating device, an air conditioner, a refrigerator, and a television set. The load 300 may include one apparatus, or may be a plurality of apparatuses.

The PCS 400 is an example of the power conversion apparatus which converts the output of the distributed power source. The PCS 400 converts the DC power output by the PV 100 and the storage battery 200 into the AC power, and outputs the AC power to the distribution board 500 for example. In addition, the PCS 400 charges the storage battery 200 by supplying the DC power output by the PV 100 to the storage battery 200.

In this way, the PCS corresponding to both of the power generation apparatus (the PV 100) and the storage battery (the storage battery 200) is also called a hybrid PCS.

Here, in a case where the PCS 400 is in the connected state with the grid 1, and the AC power output by the PCS 400 is supplied to the load 300 together with the AC power supplied from the grid 1, the operation of the PCS 400 is called the "connected operation". In addition, in a case where the PCS 400 is in a disconnected state with the grid 1, and only the AC power output by the PCS 400 is supplied to the load 300, the operation of the PCS 400 is called the "self-sustained operation".

The distribution board 500 is an apparatus for performing power distribution. The distribution board 500 is connected to the grid 1, the load 300, and the PCS 400 through the power line. In a case where the AC power output by the PCS 400 is lower than power consumption of the load 300, the distribution board 500 receives the insufficient AC power from the grid 1, and supplies the AC power output by the PCS 400 to the load 300 together with the AC power supplied from the grid 1.

The distribution board 500 may reversely supply the AC power (sell the power) output by the PCS 400 to the grid 1. However, the AC power output by the PCS 400 may include the output of the distributed power source (for example, the storage battery 200) which is not allowed for reverse power flow. In such a case, it should be noted that the distribution board 500 reversely supplies only the output of the distributed power source (for example, the PV 100) which is allowed for reverse power flow, to the grid 1.

In addition, the distribution board 500 disconnects the load 300 and the PCS 400 from the grid 1 by shutting down a main breaker at the time of blackout of the grid 1.

In addition, the distribution board 500 is connected to the PCS 400 and the EMS 700 through the signal line, and performs communication using a predetermined communication protocol such as ECHONET Lite or Zig Bee (registered trademark). For example, the distribution board 500 transmits the power supplied from the grid 1 or a measurement value of the power reversely supplied to the grid 1 to the PCS 400 and the EMS 700.

The EMS 700 is an example of a control apparatus, and serves as an apparatus (Energy Management System) to control the load 300, the PCS 400, and the distribution board 500. The EMS 700 is connected to the load 300, the PCS 400, and the distribution board 500 through the signal line. The EMS 700 controls the load 300, the PCS 400, and the distribution board 500 using a signal in conformity to a predetermined communication protocol such as ECHONET Lite.

The EMS 700 acquires the output of the PV 100, electric energy (a power storage amount) accumulated by the storage battery 200, and a measurement value of the power consumption of the load 300. The EMS 700 may acquire the measurement value of the power supplied from the grid 1 or the power reversely supplied to the grid 1 from the distribution board 500 for example. In addition, the EMS 700 may acquire the output of the PV 100, a discharging/charging power of the storage battery 200, and the power storage amount of the storage battery 200 from the PCS 400. The EMS 700 may calculate estimation values of the output of the PV 100, the power storage amount of the storage battery 200, and the power consumption of the load 300 based on these measurement values. In addition, the EMS 200 may transmit these measurement values to the PCS 400.

In addition, the EMS 700 may be connected to various types of servers through an external network. The EMS 700 may acquire, for example, information such as a purchase unit price of the power supplied from the grid 1, and a sales unit price of the power to the grid 1 from various types of servers.

(2) Detailed Configuration of PCS

Figure 2:
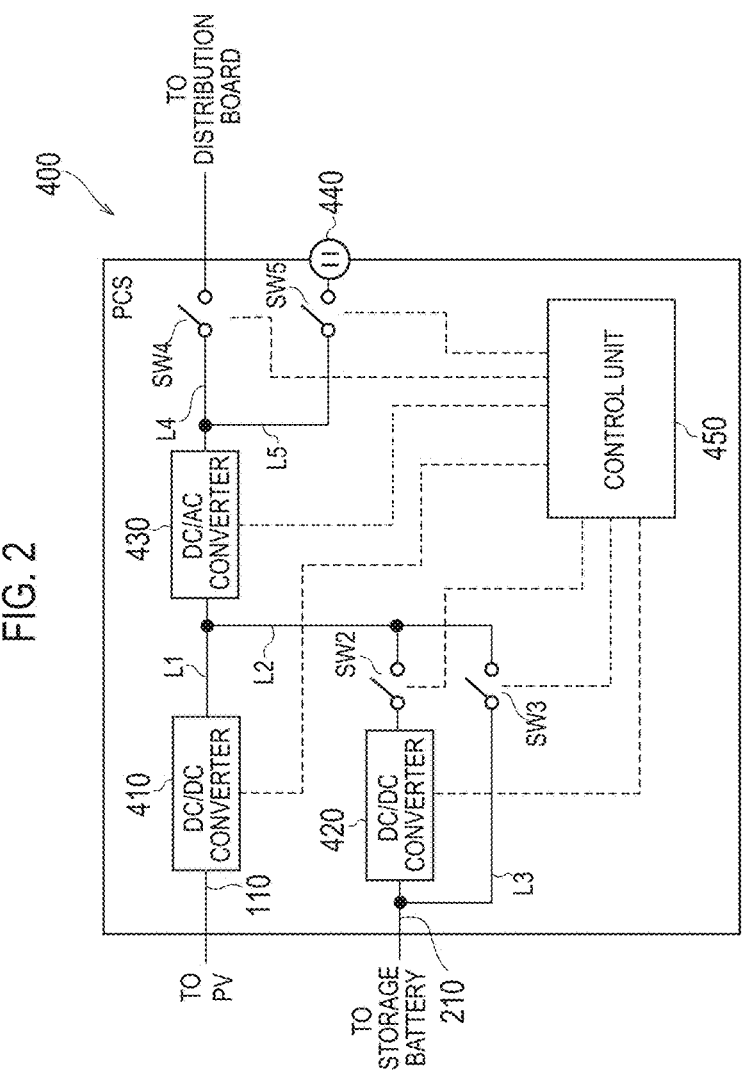
FIG. 2 is a diagram illustrating a detailed configuration of a PCS according to the embodiment of the present invention.

In the following, a detailed configuration of the PCS 400 according to the present embodiment will be described. FIG. 2 is a diagram illustrating the PCS 400 in detail.

As illustrated in FIG. 2, the PCS 400 according to the present embodiment includes DC/DC converters 410 and 420, a DC/AC converter 430, a self-sustained operation outlet 440, and a control unit 450.

The DC/DC converter 410 is connected to a power source line 110 of the PV 100. In addition, the DC/DC converter 410 is connected to the DC/AC converter 430 through a power line L1.

The DC/DC converter 420 is connected to a power source line 210 of the storage battery 200. In addition, the DC/DC converter 420 is connected to a power line L2 which branches from the power line L1.

As illustrated in FIG. 2, the PCS 400 is provided with a power line L3 which braches from the power line L2 and joins with the power source line 210. In other words, the power line L3 forms a route which bypasses the DC/DC converter 420 and connects the storage battery 200 to the power line L1. In the power line L2, a switch SW2 is provided on a side near the DC/DC converter 420 from a node connected with the power line L3. Further, in the power line L3, a switch SW3 is provided.

The DC/AC converter 430 is connected to the DC/DC converter 410 through the power line L1, and connected to the DC/DC converter 420 through the power lines L1 and L2. In addition, the DC/AC converter 430 is connected to the distribution board 500 through a power line L4.

The self-sustained operation outlet 440 is a connection port for the connection of the load 300 to the PCS 400. The self-sustained operation outlet 440 is connected to the DC/AC converter 430 through a power line L5 branching from the power line L4. As illustrated in FIG. 2, in the power line L4, a switch SW4 is provided on a side near the distribution board 500 from a node connected with the power line L5. Further, in the power line L5, a switch SW5 is provided.

The control unit 450 controls various functions of the PCS 400. In addition, the control unit 450 acquires a measurement value of the output of the PV 100, measurement values of the discharging/charging power and the power storage amount of the storage battery 200, and a measurement value of the power supplied to the load 300 by the self-sustained operation outlet 440.

The control unit 450 communicates with the EMS 700 using a signal in conformity to a predetermined communication protocol such as ECHONET Lite. The control unit 450 may transmit the acquired various measurement values to the EMS 700. In addition, the control unit 450 may include a user interface to receive an input from a user.

In the present embodiment, in a case where the PCS 400 performs the connected operation, the control unit 450 turns on the switch SW4 (a closed state), and turns off the switch SW5 (an opened state). The DC/AC converter 430 converts the DC power input through the power line L1 into the AC power, and outputs the AC power to the power line L4. The AC power output to the power line L4 is input to the distribution board 500. The AC power input to the distribution board 500 is supplied to the grid 1 and/or the load 300.

At this time, in a case where the PV 100 generates (outputs) power, the DC/DC converter 410 boosts the DC power output by the PV 100, and outputs the boosted DC power to the power line L1. The DC power output to the power line L1 is input to the DC/AC converter 430.

In addition, in a case where the storage battery 200 discharges (outputs) power, the control unit 450 turns on the switch SW2, and turns off the switch SW3. The DC/DC converter 420 boosts the DC power output by the storage battery 200, and outputs the boosted DC power to the power line L2. The DC power output to the power line L2 is input to the DC/AC converter 430 through the power line L1. In this way, in a case where the PCS 400 performs the connected operation, the output of the PV 100 and/or the storage battery 200 is input to the DC/AC converter 430.

On the other hand, in a case where the PCS 400 performs the self-sustained operation, the control unit 450 turns off the switch SW4, and turns on the switch SW5. Therefore, the AC power output from the DC/AC converter 430 is input to the self-sustained operation outlet 440 through the power lines L4 and L5. In this way, in a case where the PCS 400 performs the self-sustained operation, the output of the PV 100 and/or the storage battery 200 is input to the self-sustained operation outlet 440.

In the present embodiment, the PCS 400 can charge the storage battery 200 by supplying the DC power output by the PV 100 to the storage battery 200. Specifically, the control unit 450 turns off the switch SW2, and turns on the switch SW3. Therefore, the output of the PV 100 boosted by the DC/DC converter 410 is input to the storage battery 200 through the power lines L2 and L3.

(3) Operation Mode of PCS

In the following, an operation mode of the PCS 400 at the time of the operation of the PV 100 will be described. In the present embodiment, the PCS 400 operates in any one of a plurality of operation modes at the time of the operation of the PV 100.

In the present embodiment, the plurality of operation modes include, at the time of the operation of the PV 100, a first mode in which the output of the PV 100 is converted into the AC power and the AC power is supplied to the grid 1 and/or the load 300, and a second mode in which the output of the PV 100 is supplied to the storage battery 200. In the present embodiment, the first mode is called a standard mode, and the second mode is called a charging mode. In the present embodiment, the control unit 450 selects any one of the plurality of operation modes by controlling the switches SW2, SW3, SW4, and SW5.

In the present embodiment, the output voltage of the DC/DC converter 410 is different in the first mode (the standard mode) and in the second mode (the charging mode). In other words, the DC/DC converter 410 switches the voltages of the outputting DC power according to whether the output of the PV 100 is output to the DC/AC converter 430 or supplied to the storage battery 200.

(3.1) Standard Mode

In the following, the operation of the PCS 400 in the standard mode will be described. Here, it should be noted that the standard mode includes a case where the storage battery 200 discharges the power at the time of the operation of the PV 100, that is, a case where the output of the storage battery 200 is supplied to the grid 1 and/or the load 300 together with the output of the PV 100.

In a case where the standard mode is selected, the control unit 450 turns off the switch SW3. Accordingly, after being boosted by the DC/DC converter 410, the output of the PV 100 is input to the DC/AC converter 430 through the power line L1.

Here, in a case where the output of the storage battery 200 is supplied to the grid 1 and/or the load 300 together with the output of the PV 100, the control unit 450 turns on the switch SW2. The DC/DC converter 420 boosts the output of the storage battery 200, and outputs the DC power having a voltage V1 to the power line L2. The output of the storage battery 200 is input to the DC/AC converter 430 through the power lines L2 and L1, and converted into the AC power together with the output of the PV 100.

In addition, in a case where the standard mode is selected, the control unit 450 turns on the switch SW4 or the switch SW5. Therefore, at the time of the connected operation of the PCS 400, the AC power output from the DC/AC converter 430 is input to the distribution board 500 through the power line L4. In addition, at the time of the self-sustained operation of the PCS 400, the AC power output from the DC/AC converter 430 is input to the self-sustained operation outlet 440 through the power lines L4 and L5.

In the present embodiment, in a case where the standard mode is selected, the DC/DC converter 410 converts the output of the PV 100, and outputs the DC power having the voltage V1 determined according to a setting voltage of the grid 1.

Here, in a case where the AC power having the setting voltage (for example, AC 200 V) of the grid 1 is converted into the DC power, the voltage V1 is equal to the voltage of the converted DC power, which is also referred to as an intermediate voltage. In other words, the voltage V1 is a target voltage of the DC power to be input to the DC/AC converter 430 such that the voltage of the AC power output from the DC/AC converter 430 becomes equal to the setting voltage of the grid 1. In other words, the DC/DC converter 410 boosts the output of the PV 100, and outputs the DC power having the voltage V1 (for example, DC 320 V) to the DC/AC converter 430. When the DC power having the voltage V1 is converted by the DC/AC converter 430, the converted AC power has a voltage substantially equal to the setting voltage of the grid 1.

(3.2) Charging Mode

In the following, the operation of the PCS 400 in the charging mode will be described. In a case where the charging mode is selected, the control unit 450 turns off the switch SW2, and turns on the switch SW3. In addition, the control unit 450 turns off both of the switch SW4 and the switch SW5. Accordingly, after being boosted by the DC/DC converter 410, the output of the PV 100 is input to the storage battery 200 through the power lines L1, L2, and L3.

In the present embodiment, in a case where the charging mode is selected, the DC/DC converter 410 converts the output of the PV 100, and outputs the DC power having a voltage V2 determined according to a charging voltage of the storage battery 200. The voltage V2 is substantially equal to the charging voltage of the storage battery 200 (for example, DC 180 V), and generally lower than the voltage V1.

(3.3) Selection of Operation Mode

In the following, the selection of the operation mode of the PCS 400 at the time of the operation of the PV 100 will be described. In the present embodiment, the control unit 450 selects any one of the plurality of operation modes in a time-division manner. Hereinafter, the selection of the operation mode of the PCS 400 will be described in a case where the PCS 400 is (1) in the disconnected state with the grid, and (2) in the connected state with the grid.

(3.3.1) Disconnected State with Grid

In a case where the grid 1 is blackout, the PCS 400 needs to supply the power to the load 300 by performing the self-sustained operation. On the other hand, the PCS 400 needs to charge the storage battery 200 with the output of the PV 100 for the case of night or rainy weather when the PV 100 stops its operation.

Therefore, in the present embodiment, at the time of the operation of the PV 100, the control unit 450 selects the standard mode or the charging mode according to at least any one of an operation state of the load 300, the output of the PV 100, the power storage amount of the storage battery 200, and the voltage of the grid 1.

First, the control unit 450 determines whether the load 300 is a load performing an intermittent operation. Here, the load performing the intermittent operation means a load which does not perform a continuous operation, that is, a load of which the state is periodically repeated between an operation state and a standby state.

The load performing the intermittent operation includes, for example, a refrigerator or a pot. For example, the refrigerator consumes a lot of power while a compressor is operating (the operation state), and only a small amount of standby power is consumed while the compressor is stopped in preparation for the case of shifting to the operation state (the standby state). In other words, even when the power supply to the refrigerator is temporarily stopped in the standby state where the compressor is stopped, there is little influence on a cooling function. Therefore, in a case where the load 300 is in the standby state, it is possible to temporarily stop the power supply to the load 300.

In the present embodiment, in a case where the load 300 performs the intermittent operation, the control unit 450 selects the standard mode or the charging mode according to whether the load 300 is in the operation state. On the other hand, in a case where the load 300 performs the continuous operation, the control unit 450 selects the standard mode. Hereinafter, the description will be made focusing on a case where the load 300 performs the intermittent operation.

For example, in a case where the power consumption of the load 300 is larger than a threshold, the control unit 450 determines that the load 300 is in the operation state. In a case where the power consumption of the load 300 is smaller than the threshold, the control unit 450 determines that the load 300 is in the standby state.

In the present embodiment, in a case where the power consumption of the load 300 is larger than the threshold (a first threshold), the control unit 450 selects the standard mode. In addition, in a case where the power consumption of the load 300 is smaller than the threshold, the control unit 450 selects the charging mode. The power consumption of the load 300 may be a measurement value, or may be an estimation value. The threshold of the power consumption of the load 300 may be a rated power consumption in the operation state of the load 300, or may be a value calculated from the measurement value of the power consumption of the load 300.

In addition, the control unit 450 may switch the operation mode using a timer. For example, the control unit 450 selects the standard mode at the time when the estimation value of the power consumption of the load 300 exceeds the threshold, and then selects the charging mode at the time when a predetermined time elapses. Specifically, the control unit 450 sets an estimated continuation time of the operation state of the load 300 using a timer. The control unit 450 determines that the power consumption of the load 300 is smaller than the threshold and the load 300 is shifted from the operation state to the standby state at the time when the estimated continuation time set by the timer elapses from the time when the estimation value of the power consumption of the load 300 exceeds the threshold.

In addition, for example, in a case where the output of the PV 100 is reduced due to cloudy weather, the PCS 400 needs to increase the power storage amount of the storage battery 200 in preparation for night when the PV 100 stops its operation. Therefore, in a case where the power supply to the load 300 may be stopped, the PCS 400 needs to supply the output of the PV 100 to the storage battery 200.

In the present embodiment, in a case where the power consumption of the load 300 is smaller than the threshold (that is, a case where the load 300 is in the standby state) and a case where the output of the PV 100 is lower than the threshold (a second threshold), the control unit 450 may select the charging mode. The threshold of the output of the PV 100 may be set by the user, or may be calculated by the control unit 450 on the basis of the output of the PV 100 and the power storage amount or the like of the storage battery 200.

In addition, the self-sustained operation outlet 440 is generally set with a maximum capacity indicating a maximum value of the suppliable power. In other words, in a case where the output of the PV 100 is larger than the maximum capacity of the self-sustained operation outlet 440, a surplus AC power cannot be supplied to the load 300 and uselessly wasted.

In the present embodiment, in a case where the power consumption of the load 300 is smaller than the threshold (that is, a case where the load 300 is in the standby state) and the output of the PV 100 is larger than the maximum capacity (the second threshold) of the self-sustained operation outlet 440, the control unit 450 may select the charging mode.

In addition, in a case where the storage battery 200 is charged in substantially full, it is not possible to charge the storage battery 200 even in a case where the power supply to the load 300 may be stopped. Therefore, even when the charging mode is selected in such a case, the output of the PV 100 boosted by the DC/DC converter 410 to be the voltage V2 cannot be supplied to the storage battery 200 and uselessly wasted.

In the present embodiment, in a case where the power storage amount of the storage battery 200 is larger than a predetermined value, the control unit 450 may select the standard mode. The predetermined value may be determined according to a discharging/charging characteristic of the storage battery 200, for example.

(3.3.2) Connected State with Grid

In a case where the PCS 400 is in the connected state with the grid 1, the load 300 is also in the connected state with the grid 1. Accordingly, the load 300 can be supplied with the power from the grid 1. Therefore, the control unit 450 may select the standard mode or the charging mode.

However, when the voltage of the grid 1 is higher than an upper limit value (for example, AC 222 V) in an appropriated range, the PCS 400 performs a function of suppressing the voltage from being raised. In such a case, even at the time of the operation of the PV 100, the output from the PCS 400 is suppressed, and the AC power cannot be output to the distribution board 500.

Therefore, in the present embodiment, the control unit 450 selects the standard mode or the charging mode according to the voltage of the grid 1. Specifically, in a case where the voltage of the grid 1 is higher than the upper limit value in the appropriate range, the control unit 450 selects the charging mode.

As described above, the control unit 450 selects any one of the plurality of operation modes in a time-division manner. The DC/DC converter 410 switches the voltage of the outputting DC power to the voltage V1 or the voltage V2 according to the selected operation mode. Therefore, there is no need to decrease the DC power output by the voltage V1 to the voltage V2, and a conversion loss caused by boosting and decreasing is suppressed.

In addition, at the time of the operation of the PV 100, the control unit 450 selects the operation mode according to at least any one of the operation state of the load 300, the output of the PV 100, the power storage amount of the storage battery 200, and the voltage of the grid 1. Therefore, the output of the PV 100 can be effectively used without being uselessly wasted.

(4) Control Method

Figure 3:
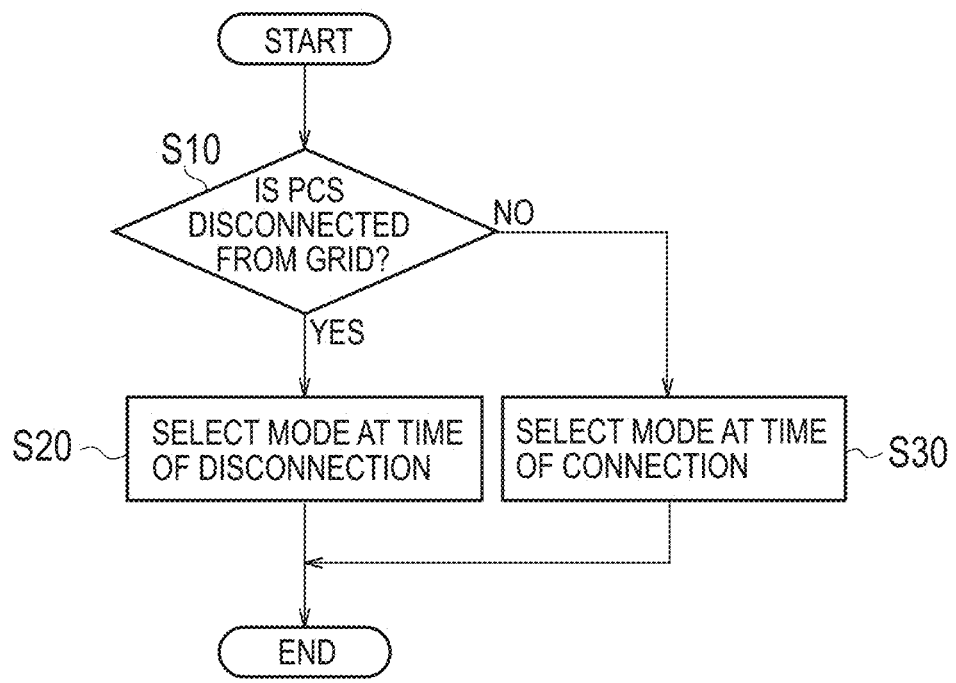
FIG. 3 is a flowchart illustrating a control method according to the embodiment of the present invention.

In the following, the control method according to the embodiment of the invention will be described. FIG. 3 is a flowchart illustrating the control method according to the embodiment of the present invention.

As illustrated in FIG. 3, in Step S10, the PCS 400 determines whether the PCS 400 is in the disconnected state with the grid 1. In a case where the determination result is YES, the PCS 400 proceeds to the process of Step S20, and selects the operation mode at the time of disconnection. In a case where the determination result is NO, the PCS 400 proceeds to the process of Step S30, and selects the operation mode at the time of connection.

Figure 4:
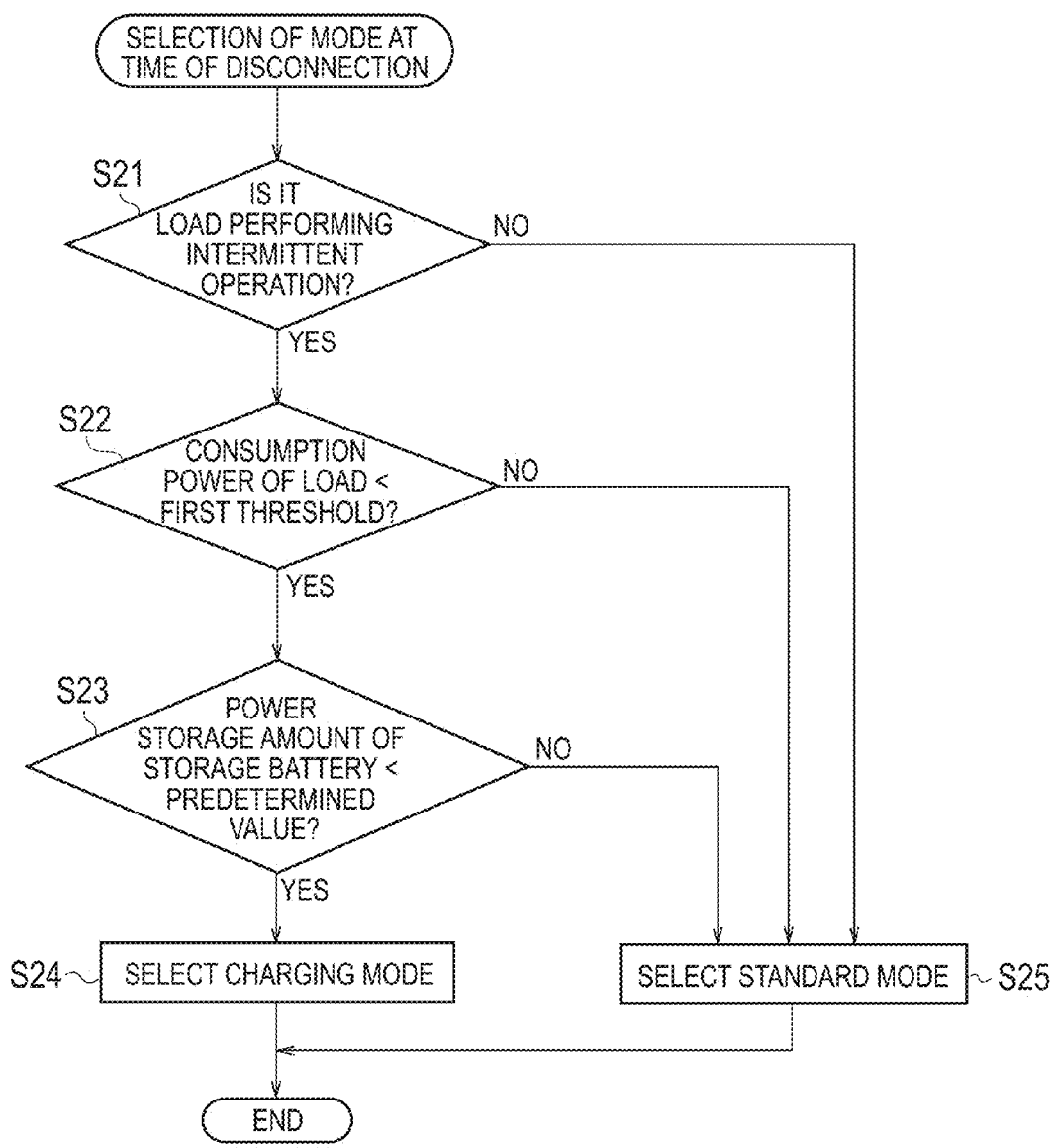
FIG. 4 is a diagram illustrating a selection flow of an operation mode at the time of disconnection according to the embodiment of the present invention.

FIG. 4 is a diagram illustrating a selection flow of the operation mode at the time of disconnection in Step S20. In Step S21, the PCS 400 determines whether the load 300 performs the intermittent operation.

In Step S21, in a case where the determination result is YES, the PCS 400 proceeds to the process of Step S22. In a case where the determination result is NO, the PCS 400 proceeds to the process of Step S25.

In Step S22, the PCS 400 determines whether the load 300 is in the standby state. Specifically, in a case where the power consumption of the load 300 is smaller than the first threshold, the PCS 400 determines that the load 300 is in the standby state. In a case where the determination result is YES, the PCS 400 proceeds to the process of Step S23. In a case where the determination result is NO, the PCS 400 proceeds to the process of Step S25.

In Step S23, the PCS 400 determines whether the power storage amount of the storage battery 200 is smaller than a predetermined value. In a case where the determination result is YES, the PCS 400 proceeds to the process of Step S24. In a case where the determination result is NO, the PCS 400 proceeds to the process of Step S25.

In Step S24, the PCS 400 selects the charging mode. In the charging mode, the PCS 400 boosts the output of the PV 100 by the DC/DC converter 410, and supplies the DC power having the voltage V2 to the storage battery 200.

In Step S25, the PCS 400 selects the standard mode. In the standard mode, the PCS 400 boosts the output of the PV 100 by the DC/DC converter 410, converts the DC power having the voltage V1 by the DC/AC converter 430, and supplies the AC power having a voltage suitable to the grid 1 to the grid 1 and/or the load 300.

Figure 5:
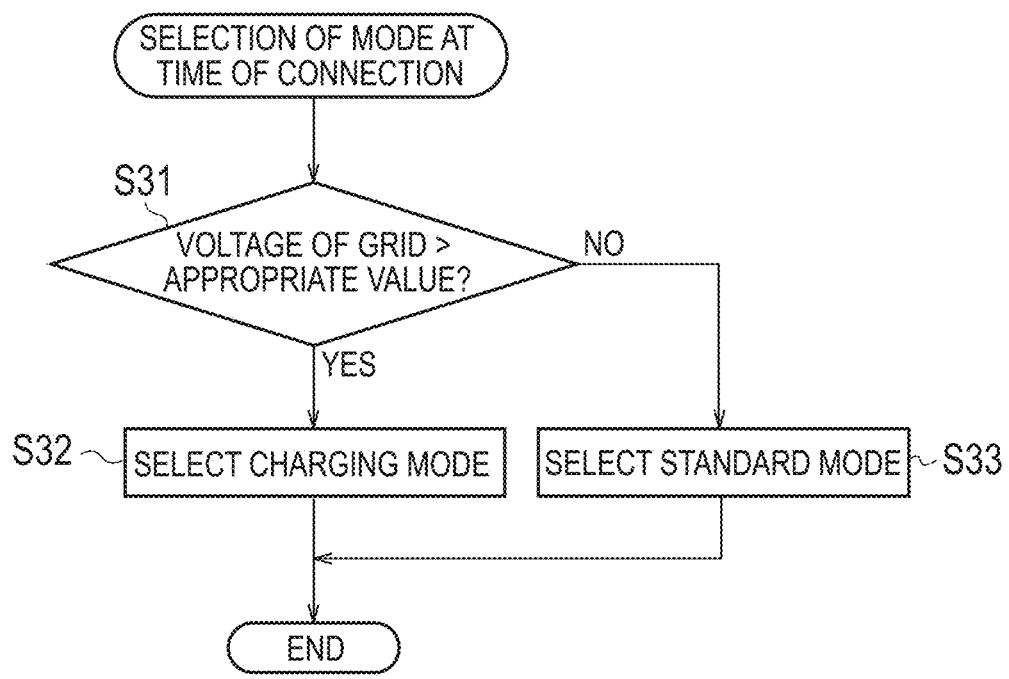
FIG. 5 is a diagram illustrating a selection flow of an operation mode at the time of connection according to the embodiment of the present invention.

FIG. 5 is a diagram illustrating a selection flow of the operation mode at the time of connection in Step S30. In Step S31, the PCS 400 determines whether the voltage of the grid 1 exceeds an appropriate value. In a case where the determination result is YES, the PCS 400 proceeds to the process of Step S32. In a case where the determination result is NO, the PCS 400 proceeds to the process of Step S33.

In Step S32, the PCS 400 selects the charging mode. In the charging mode, the PCS 400 boosts the output of the PV 100 by the DC/DC converter 410, and supplies the DC power having the voltage V2 to the storage battery 200.

In Step S33, the PCS 400 selects the standard mode. In the standard mode, the PCS 400 boosts the output of the PV 100 by the DC/DC converter 410, converts the DC power having the voltage V1 by the DC/AC converter 430, and supplies the AC power having a voltage suitable to the grid 1 to the grid 1 and/or the load 300.

Through the procedure described above, the power conversion apparatus in the present embodiment can suppress the conversion loss of the output of the power generation apparatus.

[First Modification]

Figure 6:
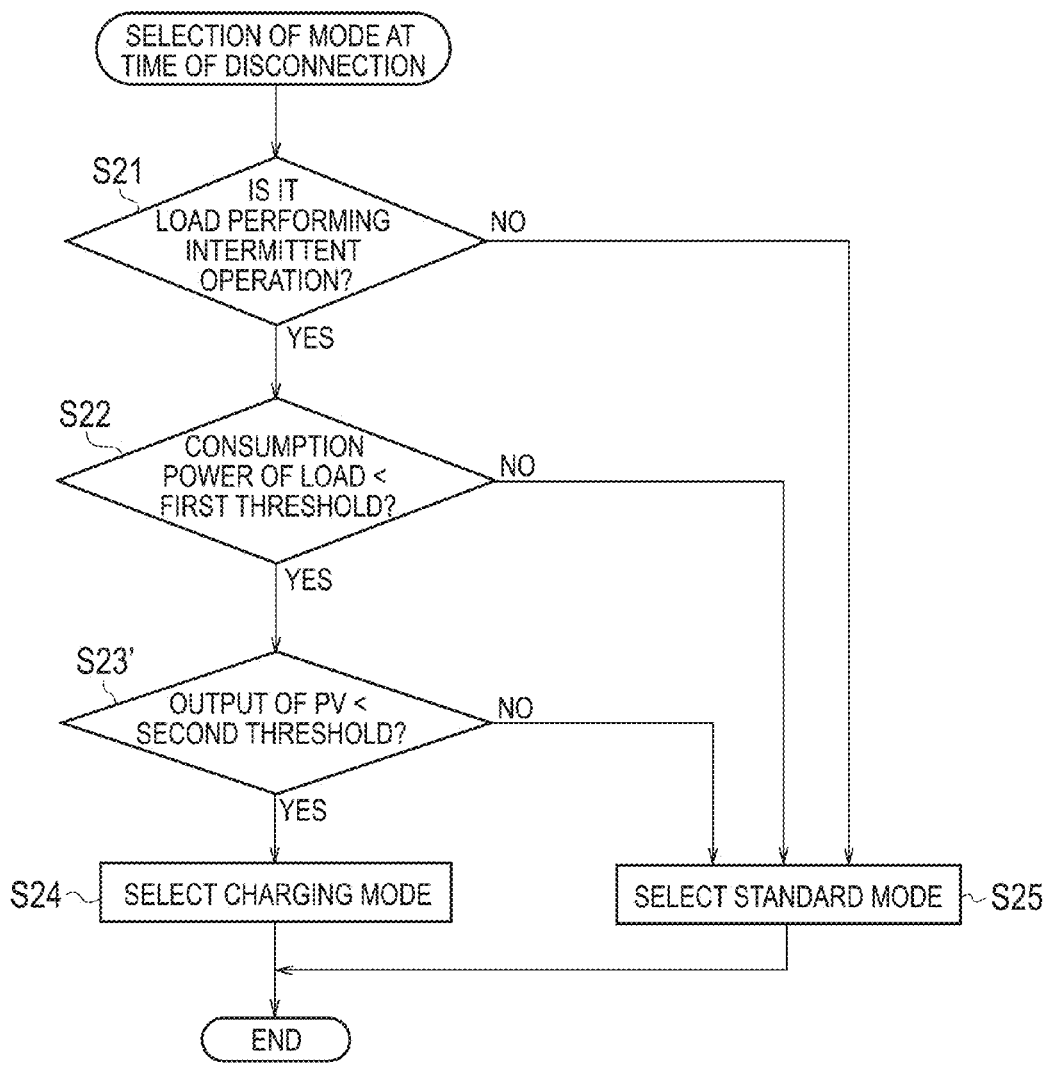
FIG. 6 is a diagram illustrating a selection flow of an operation mode at the time of disconnection according to a first modification of the present invention.

In the following, a first modification of the present embodiment will be described. FIG. 6 is a diagram illustrating a selection flow of the operation mode at the time of disconnection according to the first modification of the invention. In the following, the description will be mainly made on a difference from the present embodiment.

As illustrated in FIG. 6, the processes of Steps S21 and S22 in the first modification are the same as the processes of Steps S21 and S22 in the present embodiment. In Step S22, in a case where the determination result is YES, the PCS 400 proceeds to the process of Step S23'.

In Step S23', the PCS 400 determines whether the output of the PV 110 is lower than the second threshold. In a case where the determination result is YES, the PCS 400 proceeds to the process of Step S24. In a case where the determination result is NO, the PCS 400 proceeds to the process of Step S25. The processes of Steps S24 and S25 in the first modification are the same as the processes of Steps S24 and S25 in the present embodiment.

[Second Modification]

Figure 7:
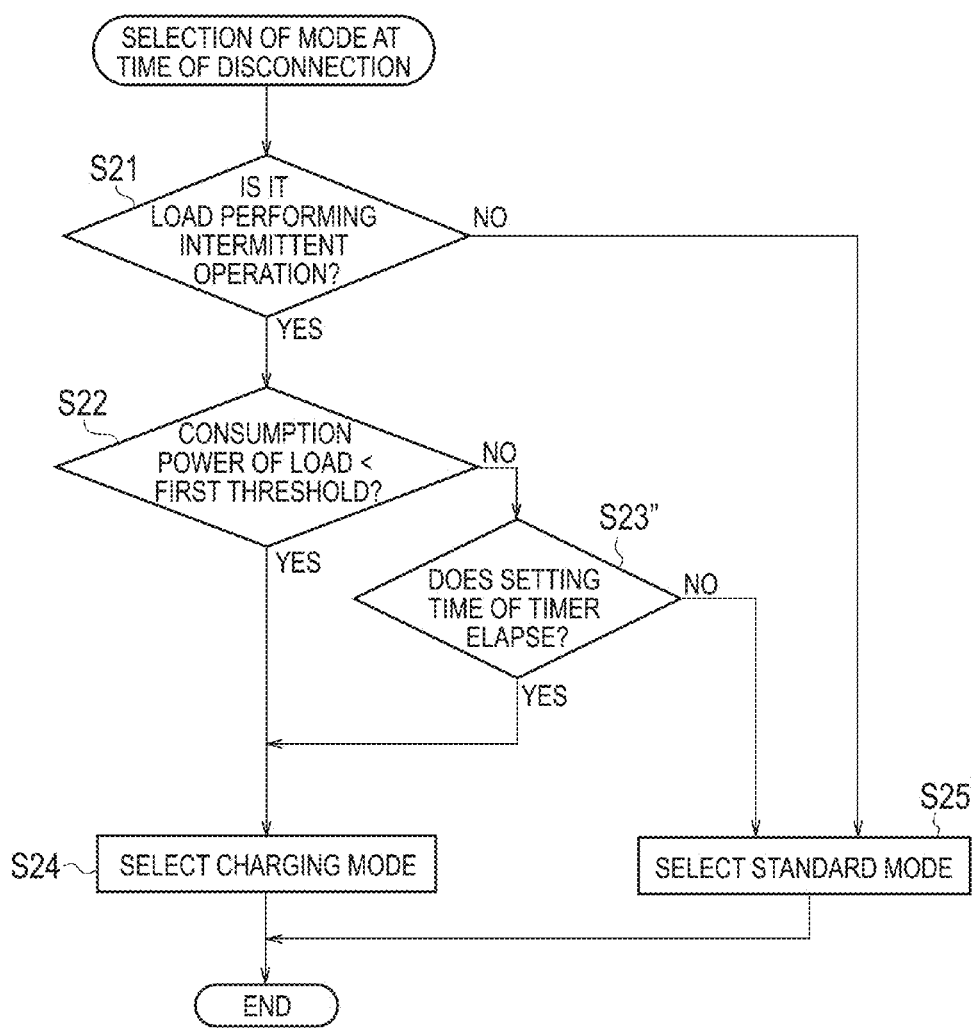
FIG. 7 is a diagram illustrating a selection flow of an operation mode at the time of disconnection according to a second modification of the present invention.

In the following, a second modification of the present embodiment will be described. FIG. 7 is a diagram illustrating a selection flow of the operation mode at the time of disconnection according to the second modification of the invention. In the following, the description will be mainly made on a difference from the present embodiment.

As illustrated in FIG. 7, the processes of Steps S21 and S22 in the second modification are the same as the processes of Steps S21 and S22 in the present embodiment. In Step S22, in a case where the determination result is NO, the PCS 400 proceeds to the process of Step S23".

In Step S23", the PCS 400 confirms the timer in which the estimated continuation time of the operation state of the load 300 is set, and determines whether the estimated continuation time is expired. In a case where the determination result is YES, the PCS 400 proceeds to the process of Step S24. In a case where the determination result is NO, the PCS 400 proceeds to the process of Step S25. The processes of Steps S24 and S25 in the second modification are the same as the processes of Steps S24 and S25 in the present embodiment.

Other Embodiments

The present invention has been described using the above-described embodiments, and it should be understood that the explanations and the drawings contained in this disclosure are not considered as limiting the invention. A person skilled in the art can implement various alternative embodiments, examples, and operational technologies through this disclosure.

The EMS 200 may be a Home Energy Management System (HEMS), a Store Energy Management System (SEMS), a Building Energy Management System (BEMS), or a Factory Energy Management System (FEMS).

In the above-described embodiment, the PV 100 has been described as an example of the power generation apparatus. However, instead of the PV 100, the control system may include, for example, a fuel cell such as a Solid Oxide Fuel Cell (SOFC) or a Polymer Electrolyte Fuel Cell (PEFC) as the power generation apparatus. Alternatively, in addition to the PV 100, the control system may further include the fuel cell as the power generation apparatus. However, the output of the fuel cell may not be allowed for the power reversely supplied to the grid 1 (selling the power). In such a case, it should be noted that the distribution board 500 does not reversely supply the output of the fuel cell to the grid 1.

In the above-described embodiment, the description has made for a case in which the PCS 400 includes the self-sustained operation outlet 440. However, the self-sustained operation outlet 440 may be separately provided from the PCS 400 through the power line. Alternatively, the PCS 400 may not include the self-sustained operation outlet 440. In a case where the PCS 400 does not include the self-sustained operation outlet 440, the distribution board 500 may automatically switch the PV 100 and the storage battery 200 to the self-sustained operation. In such a case, at the time of the self-sustained operation of the PV 100 and the storage battery 200, the outputs of the PV 100 and the storage battery 200 are from the PCS 400 to the distribution board 500, and supplied from the distribution board 500 to the load 300.

In the above-described embodiment, the description has been made for a case in which the control unit 450 selects any one of the plurality of operation modes. However, instead of the control unit 450, the EMS 700 may select any one of the plurality of operation modes of the PCS 400 at the time of generating the power of the PV 100 in a time-division manner. In such a case, for example, the EMS 700 selects any one of the plurality of operation modes based on the various measurement values acquired from the PCS 400 and the load 300, and transmits a control signal to the PCS 400 (the control unit 450). The PCS 400 operates in the selected operation mode according to the received control signal. Alternatively, the EMS 700 acquires the estimation values of the output of the PV 100 and the power consumption of the load 300 from various servers, and may select any one of the plurality of operation modes. Alternatively, for example, the EMS 700 may perform scheduling to select any one of the plurality of operation modes according to a schedule such as a planned power outage.

In the first modification described above, in a case where the determination result in Step S23' is YES, the PCS 400 may proceed to the process of Step S23 in the present embodiment.

In the second modification described above, in a case where the determination result in Step S23" is YES, the PCS 400 may proceed to the process of Step S23 in the present embodiment.

Note that the entire contents of Japanese Patent Application No. 2013-76261 (filed on Apr. 1, 2013) are incorporated in the present specification by reference.

INDUSTRIAL APPLICABILITY

As described above, according to the invention, it is possible to provide a power conversion apparatus, a control system, and a control method which suppress a conversion loss of the output of the power generation apparatus.

The invention claimed is:

1. A power conversion apparatus that operates while switching a plurality of operation modes, the plurality of operation modes including a first mode in which an output of the power generation apparatus is converted into AC power and the AC power is supplied to at least one of a grid and a load and a second mode in which the output of the power generation apparatus is supplied to a storage battery, the power conversion apparatus comprising:
    a DC/DC converter connected to a power source line of the power generation apparatus; and
    a DC/AC converter connected to the DC/DC converter through a first power line, wherein
    the DC/DC converter is connected to the storage battery through a second power line which branches from the first power line,
    in the first mode, the DC/DC converter outputs DC power having a first voltage determined according to a setting voltage of the grid, and
    in the second mode, the DC/DC converter outputs DC power having a second voltage, which is lower than the first voltage, determined according to a charge battery of the storage battery.

2. The power conversion apparatus according to claim 1, further comprising:

a control unit that selects any one of the first mode and the second mode among the plurality of operation modes in a time-division manner.

3. The power conversion apparatus according to claim 2, wherein
the load is a load that performs an intermittent operation, and
at the time when the power generation apparatus operates, the control unit selects any one of the first mode and the second mode according to an operation state of the load in a case where the power conversion apparatus is in a disconnected state with the grid.

4. The power conversion apparatus according to claim 3, wherein
at the time when the power generation apparatus operates, the control unit selects the second mode in a case where the power conversion apparatus is in the disconnected state with the grid and the power consumption of the load is smaller than a first threshold.

5. The power conversion apparatus according to claim 4, wherein
at the time when the power generation apparatus operates, the control unit selects the first mode in a case where the power conversion apparatus is in the disconnected state with the grid and the power consumption of the load is larger than the first threshold.

6. The power conversion apparatus according to claim 5, wherein
the control unit selects the second mode in a case where a predetermined time elapses from a time when the power consumption of the load exceeds the first threshold.

7. The power conversion apparatus according to claim 4, wherein
at the time when the power generation apparatus operates, the control unit selects the second mode in a case where the power conversion apparatus is in the disconnected state with the grid, and the power consumption of the load is smaller than the first threshold and the output of the power generation apparatus is lower than a second threshold.

8. The power conversion apparatus according to claim 4, wherein
at the time when the power generation apparatus operates, the control unit selects the second mode in a case where the power conversion apparatus is in the disconnected state with the grid, and the power consumption of the load is smaller than the first threshold and the output of the power generation apparatus is larger than a second threshold.

9. The power conversion apparatus according to claim 2, wherein
at the time when the power generation apparatus operates, the control unit selects the first mode in a case where electric energy accumulated in the storage battery is larger than a predetermined value.

10. The power conversion apparatus according to claim 2, wherein
at the time when the power generation apparatus operates, the control unit selects any one of the first mode and the second mode according to a voltage of the grid in a case where the power conversion apparatus is in a connected state with the grid.

11. A control system comprising:
a power conversion apparatus that operates while switching a plurality of operation modes; and
a control apparatus that controls the power conversion apparatus, wherein
the plurality of operation modes includes a first mode in which an output of the power generation apparatus is converted into AC power and the AC power is supplied to at least one of a grid and a load and a second mode in which the output of the power generation apparatus is supplied to a storage battery, wherein
the power conversion apparatus comprises:
a DC/DC converter connected to a power source line of the power generation apparatus, and
a DC/AC converter connected to the DC/DC converter through a first power line, wherein
the DC/DC converter is connected to the storage battery through a second power line which branches from the first power line,
in the first mode, the DC/DC converter outputs DC power having a first voltage determined according to a setting voltage of the grid, and
in the second mode, the DC/DC converter outputs DC power having a second voltage, which is lower than the first voltage, determined according to a charge battery of the storage battery.

12. A control method applied to a power conversion apparatus, the power conversion apparatus including a DC/DC converter connected to a power source line of a power generation apparatus and a DC/AC converter connected to the DC/DC converter through a first power line, the DC/DC converter being connected to a storage battery through a second power line which branches from the first power line, the control method comprising the steps of:
switching, in a time-division manner, a first mode in which the power conversion apparatus converts an output of the power generation apparatus into AC power and supplies the AC power to at least one of a grid and a load, and a second mode in which the output of the power generation apparatus is supplied to the storage battery;
in the first mode, outputting from the DC/DC converter DC power having a first voltage determined according to a setting voltage of the grid, and
in the second mode, outputting from the DC/DC converter DC power having a second voltage, which is lower than the first voltage, determined according to a charge battery of the storage battery.

* * * * *